US012800833B2

(12) United States Patent
Sasaki et al.

(10) Patent No.: US 12,800,833 B2
(45) Date of Patent: Nov. 17, 2026

(54) OPTICAL FIBER HOLDER AND FUSION SPLICER

(71) Applicant: Sumitomo Electric Optifrontier Co., Ltd., Yokohama (JP)

(72) Inventors: Tomoyoshi Sasaki, Yokohama (JP); Kazufumi Joko, Yokohama (JP); Ryuichiro Sato, Yokohama (JP)

(73) Assignee: Sumitomo Electric Optifrontier Co., Ltd., Yokohama (JP)

( * ) Notice: Subject to any disclaimer, the term of this patent is extended or adjusted under 35 U.S.C. 154(b) by 256 days.

(21) Appl. No.: 18/706,032

(22) PCT Filed: Oct. 25, 2022

(86) PCT No.: PCT/JP2022/039757
§ 371 (c)(1),
(2) Date: Apr. 30, 2024

(87) PCT Pub. No.: WO2023/085081
PCT Pub. Date: May 19, 2023

(65) Prior Publication Data

US 2026/0160948 A1 Jun. 11, 2026

(30) Foreign Application Priority Data

Nov. 11, 2021 (JP) ................................ 2021-183821

(51) Int. Cl.
*G02B 6/255* (2006.01)

(52) U.S. Cl.
CPC ......... *G02B 6/2555* (2013.01); *G02B 6/2553* (2013.01)

(58) Field of Classification Search
CPC .......................................... G02B 6/2555–2556
See application file for complete search history.

(56) References Cited

U.S. PATENT DOCUMENTS 5,787,216 A 7/1998 Bice et al.
2004/0067026 A1* 4/2004 Kanda .................. G02B 6/2555 385/52

(Continued)

FOREIGN PATENT DOCUMENTS

CN 109521522 A * 3/2019 ........... G02B 6/2555
FR 3089020 A1 * 5/2020 ........... G02B 6/2556

(Continued)

OTHER PUBLICATIONS

JP-4424085-B2 ((大村 真樹)) Mar. 3, 2010 (English language translation). [online] [retrieved on Mar. 20, 2026]. Retrieved from: Clarivate Analytics. (Year: 2010).*

(Continued)

*Primary Examiner* — Erin Snelting
(74) *Attorney, Agent, or Firm* — McDonald Hopkins LLC

(57) ABSTRACT

An optical fiber holder holds an optical fiber cable including an optical fiber strand and a sheath covering the optical fiber strand. The optical fiber holder includes: a base portion having a placement surface on which the optical fiber cable is placed; and a lid portion openably and closably attached to the base portion to cover at least a part of the placement surface. The lid portion includes one or a plurality of pads facing the placement surface, and pressing the optical fiber cable against the placement surface in a state where the lid portion is closed, and an angle defining portion that is located closer to a lead-out tip of the optical fiber strand than all the pads in an extending direction of the optical fiber strand, and that covers the optical fiber strand exposed from the sheath, to define a lead-out angle of the optical fiber strand.

11 Claims, 14 Drawing Sheets

(56) References Cited

U.S. PATENT DOCUMENTS

| | | | | |
|---|---|---|---|---|
| 2007/0053648 | A1 | 3/2007 | Sasaki et al. | |
| 2008/0159701 | A1 | 7/2008 | Honma | |
| 2012/0251068 | A1 * | 10/2012 | Sato | G02B 6/3616 385/137 |
| 2013/0236146 | A1 | 9/2013 | Takayanagi et al. | |
| 2014/0003785 | A1 | 1/2014 | Sato | |
| 2019/0196105 | A1 | 6/2019 | Meo et al. | |
| 2020/0292755 | A1 | 9/2020 | Sato | |

FOREIGN PATENT DOCUMENTS

| | | | |
|---|---|---|---|
| JP | H02-273705 | A | 11/1990 |
| JP | H06-347660 | A | 12/1994 |
| JP | H07-043548 | A | 2/1995 |
| JP | 2007-072080 | A | 3/2007 |
| JP | 4424085 | B2 * | 3/2010 |
| JP | 2012-137664 | A | 7/2012 |
| JP | 2017-167483 | A | 9/2017 |
| WO | 2012/140991 | A1 | 10/2012 |

OTHER PUBLICATIONS

CN-109521522-A (Yi) Mar. 26, 2019 (English language translation). [online] [retrieved on Mar. 20, 2026]. Retrieved from: Clarivate Analytics. (Year: 2019).*

FR-3089020-A1 (Boone) May 29, 2020 (English language translation). [online] [retrieved on Mar. 20, 2026]. Retrieved from: Clarivate Analytics. (Year: 2020).*

International Search Report issued in Patent Application No. PCT/JP2022/039757 dated Dec. 27, 2022.

Written Opinion issued in Patent Application No. PCT/JP2022/039757 dated Dec. 27, 2022.

* cited by examiner

OPTICAL FIBER HOLDER AND FUSION SPLICER

TECHNICAL FIELD

The present disclosure relates to an optical fiber holder and a fusion splicer. Priority is claimed on Japanese Patent Application No. 2021-183821, filed on Nov. 11, 2021, the entire content of which is incorporated herein by reference.

BACKGROUND ART

Patent Literature 1 discloses an optical fiber holder capable of holding a plurality of types of optical fibers with different outer diameters, and a fusion splicing device including the optical fiber holder. Patent Literature 2 discloses an optical fiber holder capable of holding an optical fiber while suppressing damage to a bare fiber, and a fusion splicing device including the optical fiber holder.

CITATION LIST

Patent Literature

Patent Literature 1: Japanese Unexamined Patent Publication No. 2017-167483

Patent Literature 2: Japanese Unexamined Patent Publication No. 2012-137664

SUMMARY OF INVENTION

Technical Problem

For example, there are optical fiber cables having various outer diameters and shapes such as an optical fiber cable in which an optical fiber strand with a diameter of 0.9 mm is covered with a sheath with a diameter of 3.0 mm or a diameter of 3.5 mm, and an optical fiber cable in which an optical fiber strand with a diameter of 0.25 mm is covered with a sheath having a rectangular cross section (so-called drop cable). In a fusion splicer, when bare fibers exposed from two optical fiber strands are fusion-spliced to each other, while placing optical fiber cables on a placement surface and pressing the optical fiber cables from above, end surfaces of the bare fibers are butted against, and fusion-spliced to each other by an arc discharge. The height position of electrodes that produce the arc discharge remains unchanged. Therefore, in order to cause the end surface height of bare fibers of optical fiber cables with various outer diameters to coincide with the height of an arc discharge point, it is necessary to adjust a lead-out direction of an optical fiber strand upward and downward depending on the center height of the optical fiber cable. In the fusion splicer of the related art, a member that defines a lead-out direction of an optical fiber strand, in other words, a lead-out angle of the optical fiber strand is prepared for each type of optical fiber cable, and the member is replaced depending on the center height of the optical fiber cable. However, such a method has a problem that it takes time and effort to replace members.

An object of the present disclosure is to provide an optical fiber holder and a fusion splicer capable of reducing the time and effort required to replace a member that defines a lead-out direction (lead-out angle) of an optical fiber strand.

Solution to Problem

An optical fiber holder according to one embodiment holds an optical fiber cable including an optical fiber strand and a sheath covering the optical fiber strand, and exposes the optical fiber strand to an outside. The optical fiber holder includes: a base portion having a placement surface on which the optical fiber cable is placed; and a lid portion that is openably and closably attached to the base portion to cover at least a part of the placement surface. The lid portion includes one or a plurality of pads facing the placement surface and pressing the optical fiber cable against the placement surface, in a state where the lid portion is closed, and an angle defining portion that is located closer to a lead-out tip of the optical fiber strand than all the pads in an extending direction of the optical fiber strand, and that covers the optical fiber strand exposed from the sheath to define a lead-out angle of the optical fiber strand. The angle defining portion includes a first groove and a second groove. The first groove is provided to accommodate a first optical fiber strand having a first outer diameter, which is the optical fiber strand, and defines a lead-out angle of the first optical fiber strand. The second groove is provided at a central bottom portion of the first groove, is provided to accommodate a second optical fiber strand having a second outer diameter smaller than the first outer diameter, which is the optical fiber strand, and defines a lead-out angle of the second optical fiber strand. The first groove and the second groove extend, in the extending direction of the optical fiber strand, from a first end surface of the angle defining portion close to the pad to a second end surface on an opposite side of the angle defining portion from the first end surface.

Advantageous Effects of Invention

According to the optical fiber holder and a fusion splicer of the present disclosure, it is possible to reduce the time and effort required to replace the member that defines a lead-out direction (lead-out angle) of the optical fiber strand.

DESCRIPTION OF EMBODIMENTS

Description of Embodiment of Present Disclosure

Figure 1:
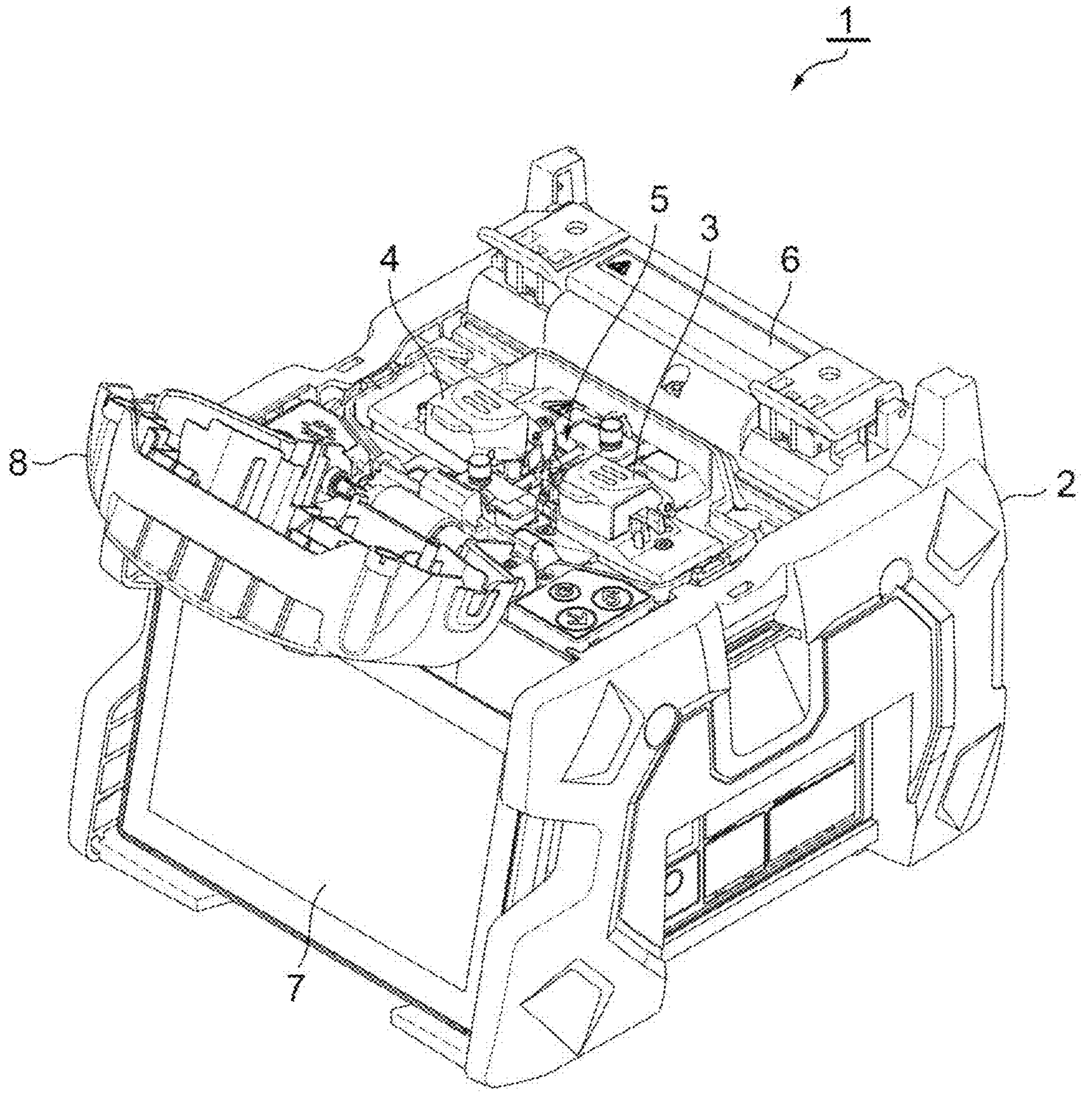
FIG. 1 is a perspective view illustrating the appearance of a fusion splicer according to one embodiment.

First, an embodiment of the present disclosure will be listed and described. An optical fiber holder according to one embodiment holds an optical fiber cable including an optical fiber strand and a sheath covering the optical fiber strand, and exposes the optical fiber strand to an outside. The optical fiber holder includes: a base portion having a placement surface on which the optical fiber cable is placed; and a lid portion that is openably and closably attached to the base portion to cover at least a part of the placement surface. The lid portion includes one or a plurality of pads facing the placement surface and pressing the optical fiber cable against the placement surface in a state where the lid portion is closed, and an angle defining portion that is located closer to a lead-out tip of the optical fiber strand than all the pads in an extending direction of the optical fiber strand, and that covers the optical fiber strand exposed from the sheath to define a lead-out angle of the optical fiber strand. The angle defining portion includes a first groove and a second groove. The first groove is provided to accommodate a first optical fiber strand having a first outer diameter, which is the optical fiber strand, and defines a lead-out angle of the first optical fiber strand. The second groove is provided at a central bottom portion of the first groove, is provided to accommodate a second optical fiber strand having a second outer diameter smaller than the first outer diameter, which is the optical fiber strand, and defines a lead-out angle of the second optical fiber strand. The first groove and the second groove extend, in the extending direction of the optical fiber strand, from a first end surface of the angle defining portion close to the pad to a second end surface on an opposite side of the angle defining portion from the first end surface. Here, the “optical fiber strand” refers to an integrated product including a glass fiber and a resin portion covering the periphery of the glass fiber, and is not limited to an optical fiber strand in which the resin portion is formed in one layer, but also includes an optical fiber strand in which the resin portion is formed in a plurality of layers.

In the optical fiber holder, the angle defining portion includes the first groove and the second groove. The first groove is provided to accommodate the first optical fiber strand having the first outer diameter, and defines the lead-out angle of the first optical fiber strand. The second groove is provided to accommodate the second optical fiber strand having the second outer diameter, and defines the lead-out angle of the second optical fiber strand. The second outer diameter is smaller than the first outer diameter, and the second groove is provided at the central bottom portion of the first groove. According to such a configuration, when a center height of an optical fiber cable including the second optical fiber strand having the second outer diameter is higher than a center height of an optical fiber cable including the first optical fiber strand having the first outer diameter, fusion splicing can be performed without replacing the angle defining portion according to these optical fiber cables. Therefore, according to the optical fiber holder, it is possible to reduce the time and effort required to replace the member that defines a lead-out direction (lead-out angle) of the optical fiber strand.

The second outer diameter may be 0.25 mm or less, and the first outer diameter may be larger than 0.25 mm. In this case, the fusion splicing of optical fiber cables (for example, the drop cables described above), each including the optical fiber strand having an outer diameter of 0.25 mm or less, and the fusion splicing of optical fiber cables (for example, the optical fiber cables with a diameter of 3.0 mm or a diameter of 3.5 mm described above), each including the optical fiber strand having an outer diameter larger than 0.25 mm, can be performed without replacing the angle defining portion.

A shape of a cross section of the second groove perpendicular to the extending direction of the optical fiber strand may be a square shape or a rectangular shape from the first end surface to the second end surface.

The base portion may include a first projection and a second projection arranged in a direction intersecting the extending direction of the optical fiber cable, and protruding from the placement surface. The optical fiber cable may be sandwiched between the first projection and the second projection to be positioned. The first projection may have a first side surface, the second projection may have a second side surface, and the first side surface and the second side surface may face each other. A distance between the first side surface and the second side surface may increase as the first side surface and the second side surface extend away from the placement surface. Each of the first side surface and the second side surface may include a first region, the first region of each of the first side surface and the second side surface may reach both ends of each of the first projection and the second projection in the extending direction of the optical fiber cable. Each of the first side surface and the second side surface may further include a second region located between the first region and the placement surface. An inclination angle of the first region with respect to the placement surface may be smaller than an inclination angle of the second region with respect to the placement surface. In this case, an optical fiber cable (for example, a drop cable) having a rectangular cross section can be accurately positioned in the second region. In addition, an optical fiber cable having a circular cross section and having a lateral width larger than the lateral width of the rectangular cross section thereof (for example, an optical fiber cable with a diameter of 3.0 mm or a diameter of 3.5 mm) can be accurately positioned in the first region.

The angle defining portion may be fixed to an end portion of two end portions of the lid portion in the extending direction of the optical fiber cable, the end portion being located closer to the lead-out tip of the optical fiber strand. In this case, it is possible to easily install the angle defining portion that is located closer to the lead-out tip of the optical fiber strand than all the pads, and that covers the optical fiber strand exposed from the sheath.

The first groove may have two flat inclined surfaces, normal lines of the two inclined surfaces may intersect each other, and the two inclined surfaces may form a V-groove. In this case, the first optical fiber strand can be stably accommodated by bringing the first optical fiber strand into contact with the two inclined surfaces.

Directions of the two inclined surfaces may be set such that a central axis direction of the first optical fiber strand is inclined in a direction toward the placement surface. For example, with such a configuration, it is possible to define the lead-out angle of the first optical fiber strand.

A boundary between the first end surface and the first groove and a boundary between the second end surface and the first groove may be rounded. In this case, it is possible to reduce damage to the first optical fiber strand when the first optical fiber strand is accommodated in the first groove.

A boundary between the first end surface and the second groove and a boundary between the second end surface and the second groove may be rounded. In this case, it is possible to reduce damage to the second optical fiber strand when the second optical fiber strand is accommodated in the second groove.

A fusion splicer according to one embodiment includes: a first optical fiber holder and a second optical fiber holder that are any of the optical fiber holders described above; and a fusion splicing unit that fusion-splices a bare fiber exposed from the optical fiber strand of a first optical fiber cable that is the optical fiber cable held by the first optical fiber holder and a bare fiber exposed from the optical fiber strand of a second optical fiber cable that is the optical fiber cable held by the second optical fiber holder, through a discharge. According to the fusion splicer, by including the first optical fiber holder and the second optical fiber holder that are any of the optical fiber holders described above, the time and effort required to replace the member that defines a lead-out direction (lead-out angle) of the optical fiber strand can be reduced.

In each of the first optical fiber holder and the second optical fiber holder, the plurality of pads may include a first pad and a second pad arranged along the extending direction of the optical fiber cable. The first pad may be located between the second pad and a splice point between the bare fiber of the first optical fiber cable and the bare fiber of the second optical fiber cable. A distance between the splice point and a first end edge of the first pad close to the splice point may be larger than 16 mm. A distance between the splice point and a second end edge on an opposite side of the first pad from the first end edge may be smaller than 20 mm. A distance between the splice point and an end edge of the second pad close to the splice point may be larger than 20 mm.

Normally, when an optical fiber strand with a diameter of 0.25 mm of a loose tube cable is fusion-spliced, the optical fiber strand with a diameter of 0.25 mm is set to be exposed from a loose tube by approximately 10 mm, and a bare fiber is set to be exposed from a tip portion of the optical fiber strand thereof by approximately 10 mm. When an optical fiber strand with a diameter of 0.25 mm that is not a loose tube cable is fusion-spliced, a bare fiber may be set to be exposed from a tip portion of the optical fiber strand thereof by approximately 16 mm. For example, in the optical fiber holder described in Patent Literature 2, in order to hold an optical fiber strand without damaging a bare fiber, the pressing portion that presses the optical fiber strand is movable along an extending direction of the optical fiber strand. However, such a method has a problem that it takes time and effort to move the pressing portion.

In response to this problem, in the fusion splicer, by disposing the first pad and the second pad as described above, both the optical fiber strand of the loose tube cable and the optical fiber strand that is not a loose tube cable can be pressed without moving the first pad and the second pad along the extending direction of the optical fiber strands. Namely, when the optical fiber strand of the loose tube cable is pressed, the first pad can press the optical fiber strand without coming into contact with the bare fiber, and the second pad can press the loose tube. When the optical fiber strand that is not a loose tube cable is pressed, the first pad and the second pad can press the optical fiber strand without coming into contact with the bare fiber. Therefore, the time and effort required to move the first pad and the second pad can be saved.

Details of Embodiment of Present Disclosure

A specific example of an optical fiber holder and a fusion splicer of the present disclosure will be described below with reference to the drawings. It is intended that the present invention is not limited to this example, but is represented by the claims and includes all changes made within the concept and scope equivalent to the claims. In the following description, the same components in the description of the drawings are denoted by the same reference signs, and duplicate descriptions will not be repeated.

FIG. 1 is a perspective view illustrating the appearance of a fusion splicer 1 according to one embodiment. The fusion splicer 1 includes a housing 2 having a box shape. A first optical fiber holder 3, a second optical fiber holder 4, and a fusion splicing unit 5 are provided at an upper portion of the housing 2. The first optical fiber holder 3 and the second optical fiber holder 4 are disposed to face each other in a predetermined direction. The first optical fiber holder 3 holds a first optical fiber cable to be fused. The second optical fiber holder 4 holds a second optical fiber cable to be fused. These optical fiber cables include those including an optical fiber strand and a sheath covering the optical fiber strand. In such an optical fiber cable, the optical fiber strand is exposed from a tip of the sheath by removing the sheath at a tip portion of the optical fiber cable. The optical fiber strand is such that a bare fiber is coated with resin. Furthermore, the bare fiber is exposed from a tip of the resin coating by removing the resin coating at a tip portion of the optical fiber strand. The bare fiber is a portion of a glass fiber exposed from the resin coating. The first optical fiber holder 3 leads out the optical fiber strand of the first optical fiber cable to the outside of the first optical fiber holder 3, namely, to the fusion splicing unit 5. The second optical fiber holder 4 leads out the optical fiber strand of the second optical fiber cable to the outside of the second optical fiber holder 4, namely, to the fusion splicing unit 5.

The fusion splicing unit 5 is disposed between the first optical fiber holder 3 and the second optical fiber holder 4. The fusion splicing unit 5 fusion-splices the bare fiber exposed from the first optical fiber cable held by the first optical fiber holder 3 and the bare fiber exposed from the second optical fiber cable held by the second optical fiber holder 4 to each other through a discharge.

The fusion splicer 1 further includes a heater 6, a monitor 7, and a windshield cover 8. The heater 6 is provided at the upper portion of the housing 2, and heats and shrinks a fiber reinforcing sleeve with which a fusion splice point of the bare fibers is covered. The monitor 7 displays an image of the fusion splice point of the bare fibers, which is captured by a camera (not illustrated) disposed inside the housing 2. The windshield cover 8 is connected to the housing 2 so as to openably and closably cover the fusion splicing unit 5, and prevents wind from entering the fusion splicing unit 5.

Figure 2:
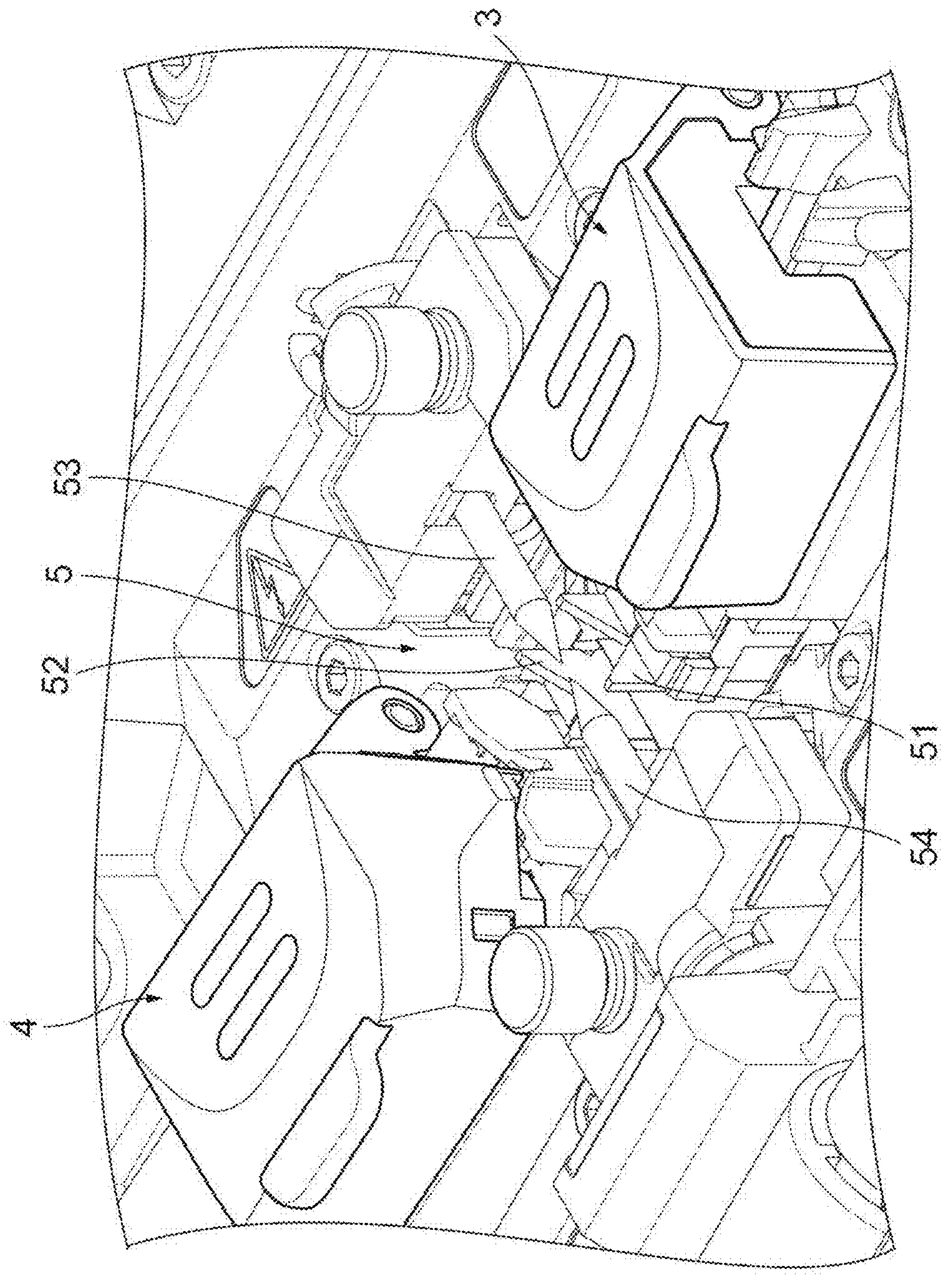
FIG. 2 is an enlarged perspective view illustrating main parts of the fusion splicer.

FIG. 2 is an enlarged perspective view illustrating main parts of the fusion splicer 1. The fusion splicing unit 5 includes a positioning member 51 and a positioning member 52. The positioning member 51 includes a V-shaped recessed portion that positions a tip portion of the bare fiber of the first optical fiber cable held by the first optical fiber holder 3. The positioning member 52 includes a V-shaped recessed portion that positions a tip portion of the bare fiber of the second optical fiber cable held by the second optical fiber holder 4. The positioning members 51 and 52 are disposed in line along the predetermined direction between the first optical fiber holder 3 and the second optical fiber holder 4. The fusion splicing unit 5 includes discharge electrodes 53 and 54 for fusion-splicing the tip portions of the bare fibers through an arc discharge. The discharge electrodes 53 and 54 are disposed between the positioning member 51 and the positioning member 52 in the predetermined direction, and face each other in a direction intersecting the predetermined direction.

Figure 3:
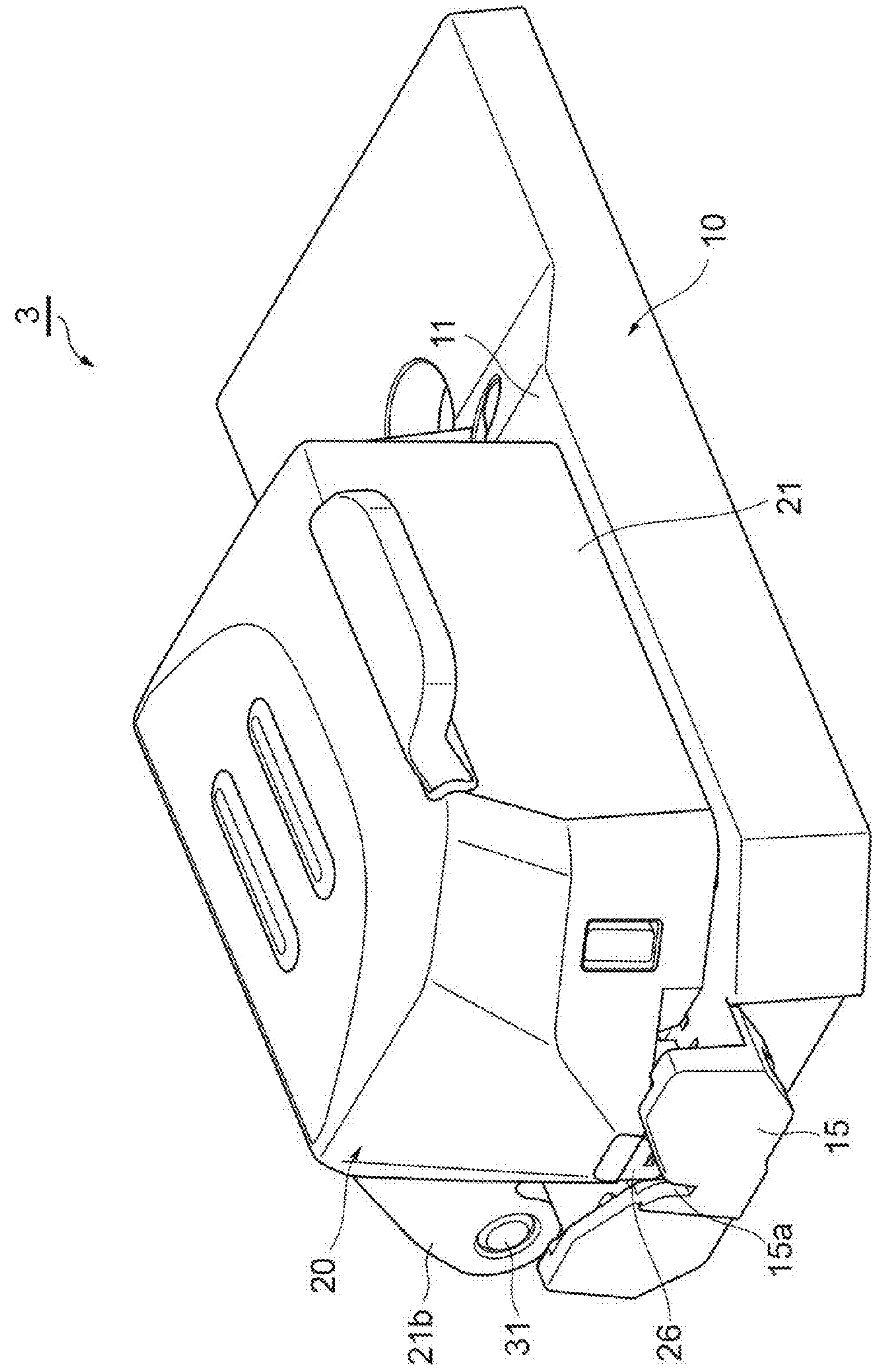
FIG. 3 is a perspective view illustrating the appearance of an optical fiber holder.
Figure 4:
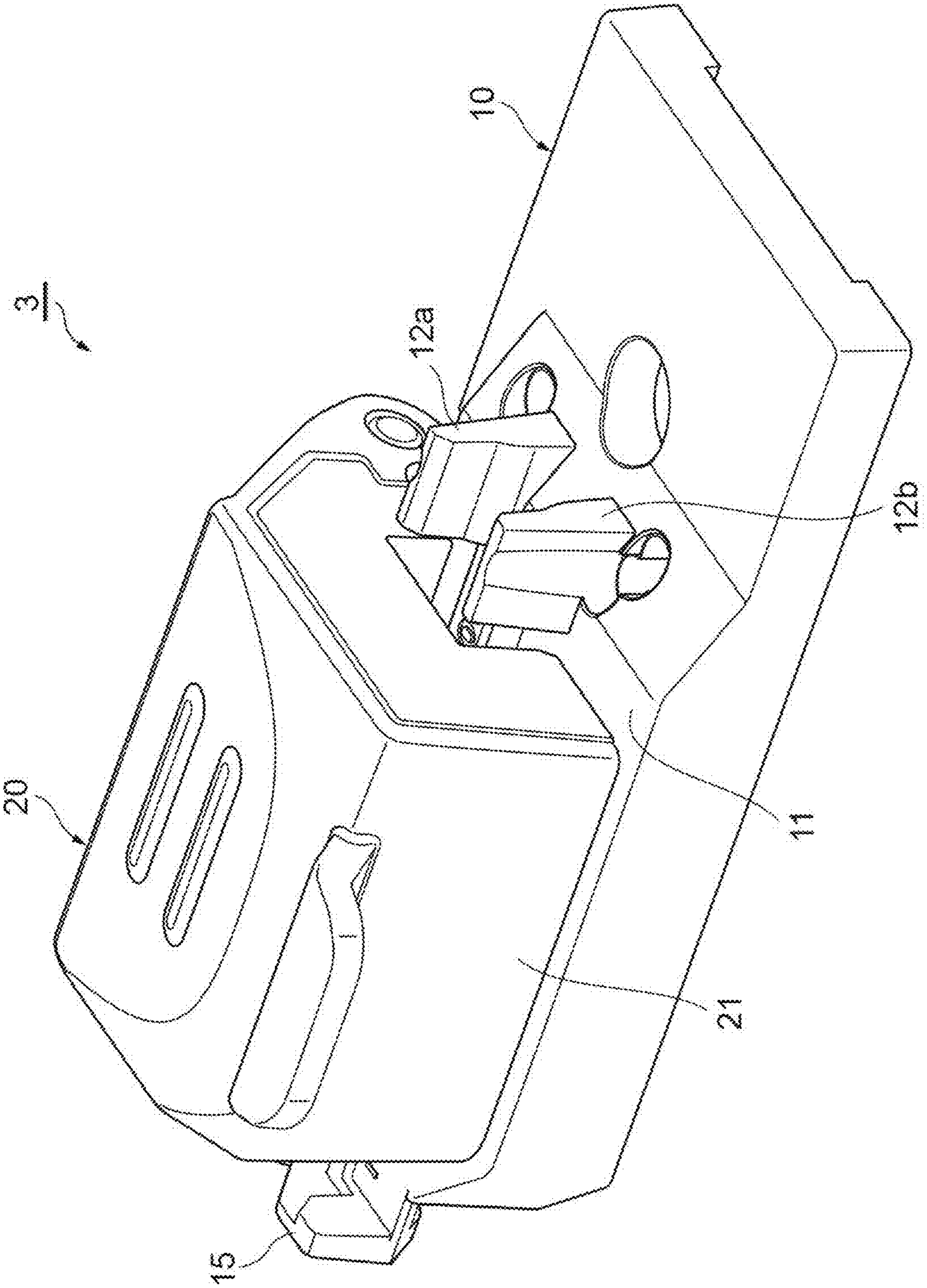
FIG. 4 is a perspective view illustrating the appearance of the optical fiber holder.
Figure 5:
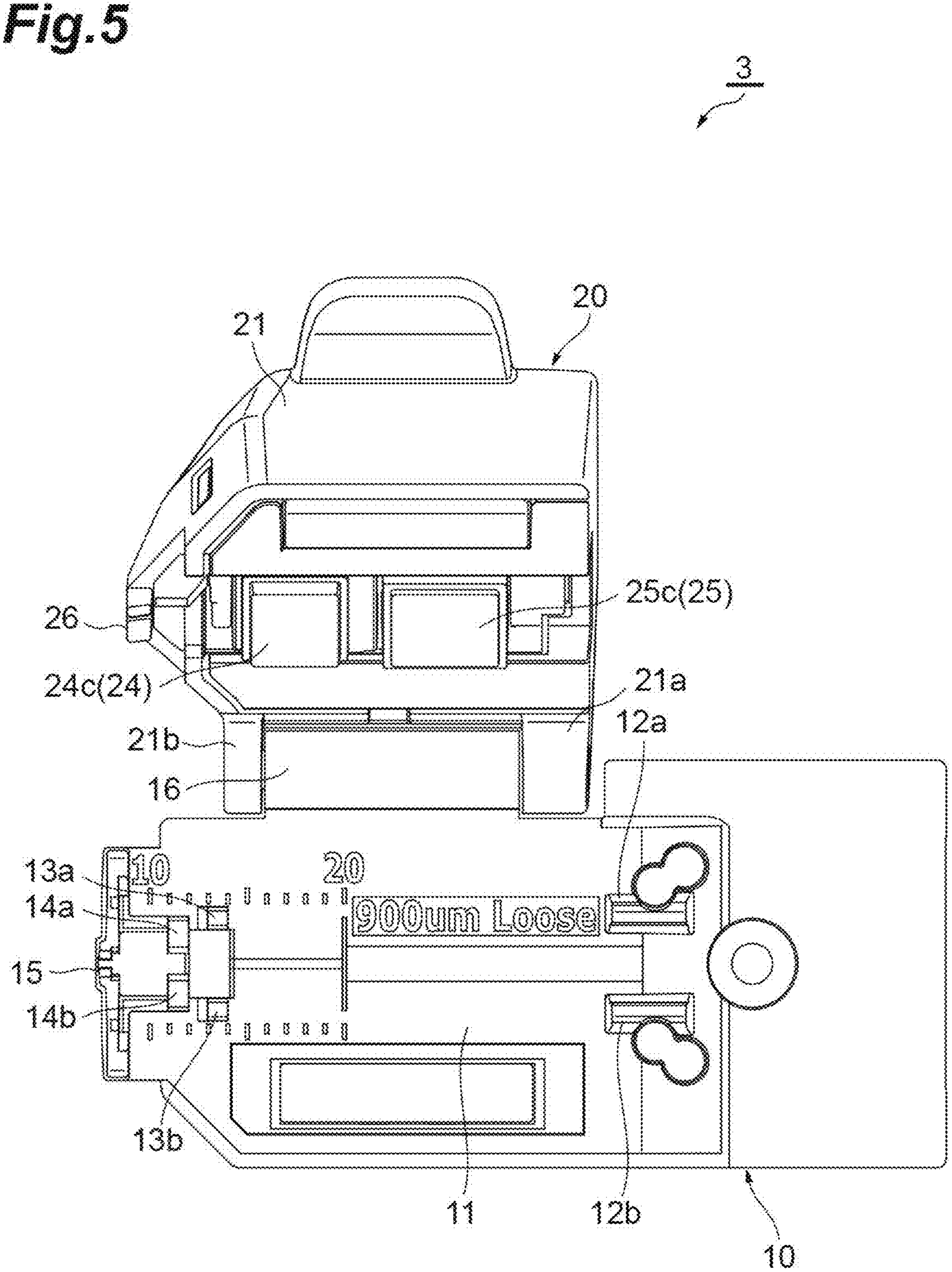
FIG. 5 is a top view illustrating a state where a lid portion of the optical fiber holder is opened.

Hereinafter, a structure of the first optical fiber holder 3 will be described in detail. The second optical fiber holder 4 has a structure that is an inversion of the structure of the first optical fiber holder 3, and includes the same components as all the components included in the first optical fiber holder 3. FIGS. 3 and 4 are perspective views illustrating the appearance of the first optical fiber holder 3. FIG. 3 is a view of the first optical fiber holder 3 when viewed obliquely from the front, namely, from a fusion splicing unit 5 side, and FIG. 4 is a view of the first optical fiber holder 3 when viewed obliquely from the rear, namely, from a side opposite to the fusion splicing unit 5. FIG. 5 is a top view illustrating a state where a lid portion 20 of the first optical fiber holder 3 is opened. As illustrated in these figures, the first optical fiber holder 3 includes a base portion 10 and the lid portion 20 that is openably and closably attached to the base portion 10.

Figure 6:
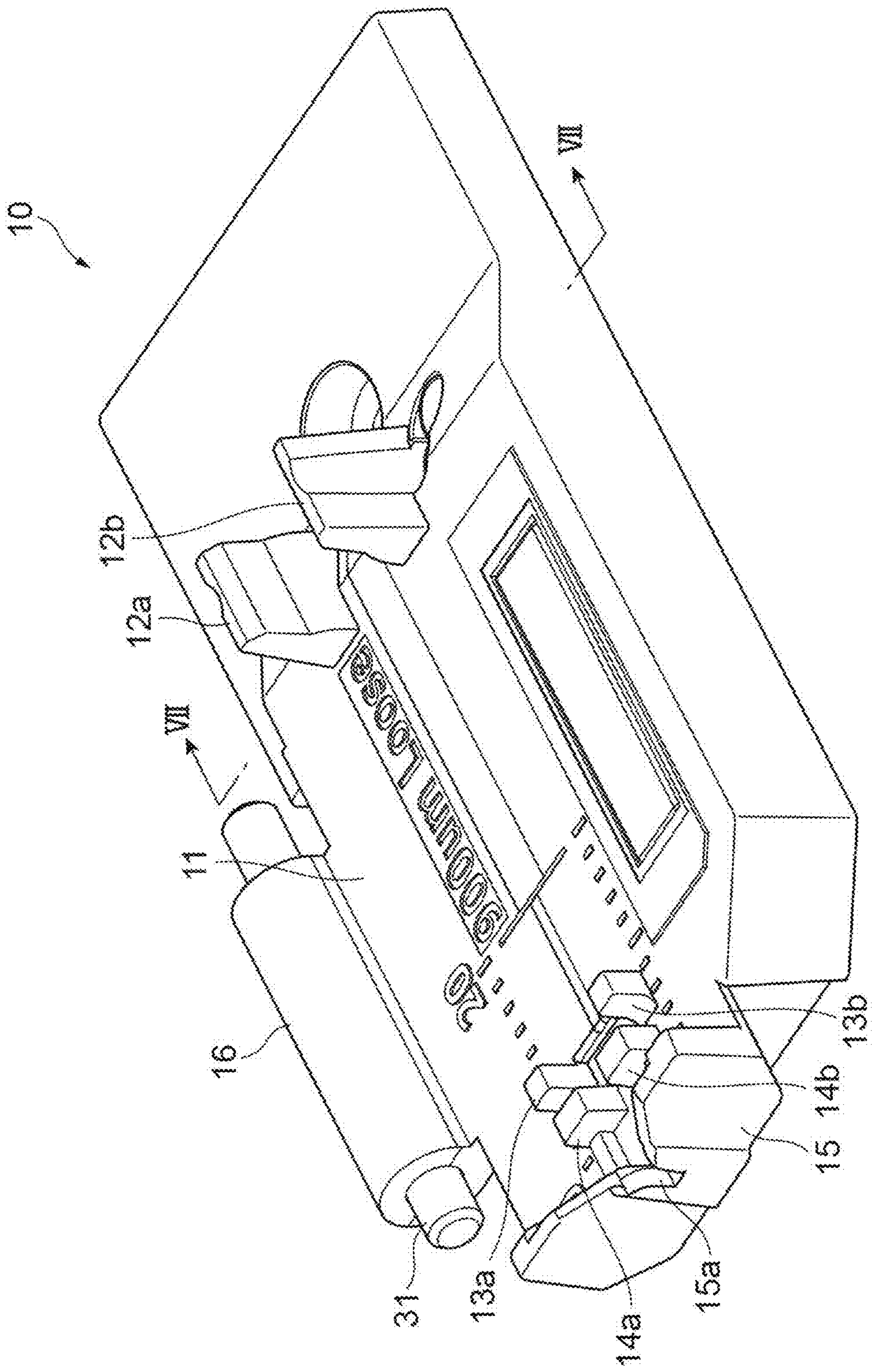
FIG. 6 is a perspective view illustrating a base portion.

FIG. 6 is a perspective view illustrating the base portion 10. The base portion 10 has a placement surface 11 that is substantially flat. An optical fiber cable is placed on the placement surface 11 along the predetermined direction. The base portion 10 is attached to the housing 2 such that when the fusion splicer 1 is placed on a horizontal surface, the placement surface 11 is parallel to the horizontal surface. The placement surface 11 has a planar shape that is long in a predetermined direction, namely, in an extending direction of the optical fiber cable.

Figure 7:
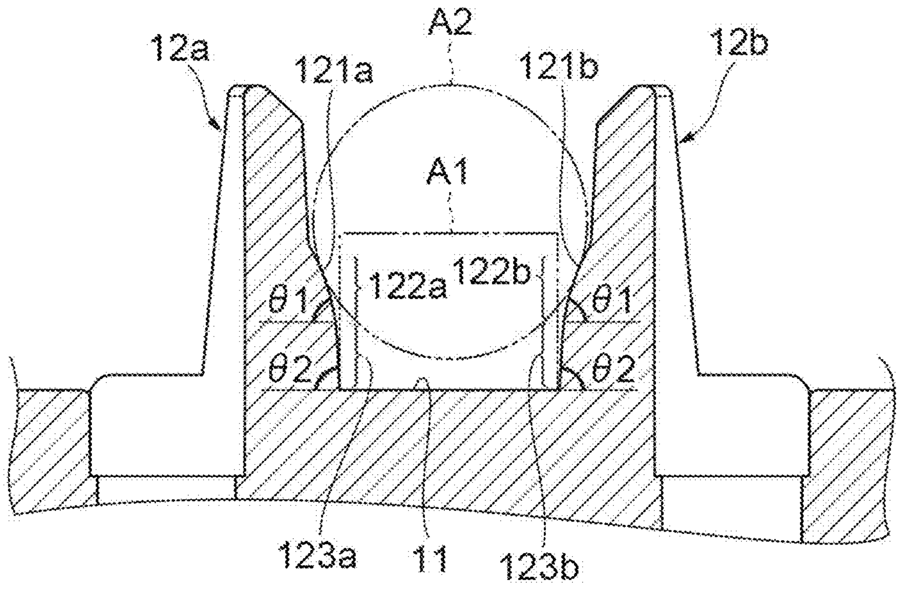
FIG. 7 is a view illustrating a part of a cross section taken along line VII-VII of FIG. 6, and illustrates cross sections of a first projection and a second projection perpendicular to an extending direction of an optical fiber cable.

The base portion 10 includes a projection 12*a* (first projection) and a projection 12*b* (second projection) protruding from the placement surface 11. The projections 12*a* and 12*b* are first guide portions that position the optical fiber cable in the direction intersecting the extending direction of the optical fiber cable. The projection 12*a* is disposed side by side with the projection 12*b* in the direction intersecting the extending direction of the optical fiber cable. The optical fiber cable is sandwiched between the projection 12*a* and the projection 12*b* to be positioned. FIG. 7 is a view illustrating a part of a cross section taken along line VII-VII of FIG. 6, and illustrates cross sections of the projections 12*a* and 12*b* perpendicular to the extending direction of the optical fiber cable. As illustrated in FIG. 7, the projection 12*a* has a side surface 121*a* (first side surface). The projection 12*b* has a side surface 121*b* (second side surface). The side surface 121*a* and the side surface 121*b* face each other in the direction intersecting the extending direction of the optical fiber cable. The distance between the side surface 121*a* and the side surface 121*b* increases as the side surface 121*a* and the side surface 121*b* extend away from the placement surface 11. The side surface 121*a* includes a region 122*a* (first region) and a region 123*a* (second region). The region 122*a* reaches both ends of the projection 12*a* in the extending direction of the optical fiber cable. The region 123*a* is located between the region 122*a* and the placement surface 11. An inclination angle θ1 of the region 122*a* with respect to the placement surface 11 is smaller than an inclination angle θ2 of the region 123*a* with respect to the placement surface 11. Similarly, the side surface 121*b* includes a region 122*b* (first region) and a region 123*b* (second region). The region 122*b* reaches both ends of the projection 12*b* in the extending direction of the optical fiber cable. The region 123*b* is located between the region 122*b* and the placement surface 11. The inclination angle θ1 of the region 122*b* with respect to the placement surface 11 is smaller than the inclination angle θ2 of the region 123*b* with respect to the placement surface 11. In the illustrated example, the region 122*a* and the region 122*b* are curved surfaces that are convex toward each other in the cross sections.

By having the above-described shape, the projections 12*a* and 12*b* can accurately position an optical fiber cable, of which the sheath has a rectangular cross section, in the regions 123*a* and 123*b*, and can accurately position an optical fiber cable, of which the sheath has a circular cross section having a diameter larger than the lateral width of the rectangular cross section, in the regions 122*a* and 122*b*. The optical fiber cable of which the sheath has a rectangular cross section is, for example, a drop cable, and the outer cross section thereof is indicated by an imaginary line A1 in the figure. The optical fiber cable of which the sheath has a circular cross section is, for example, an optical fiber cable with a diameter of 3.0 mm or a diameter of 3.5 mm, and the outer cross section thereof is indicated by an imaginary line A2.

Referring again to FIG. 6, the base portion 10 further includes projections 13*a* and 13*b*. The projections 13*a* and 13*b* are located closer to the lead-out tip of the optical fiber strand than the projections 12*a* and 12*b*, in other words, are located in a direction toward the fusion splicing unit 5 with respect to the projections 12*a* and 12*b*, and protrude from the placement surface 11. The projections 13*a* and 13*b* are second guide portions that position the optical fiber cable in the direction intersecting the extending direction of the optical fiber cable. The projection 13*a* is disposed side by side with the projection 13*b* in the direction intersecting the extending direction of the optical fiber cable. The optical fiber cable is sandwiched between the projection 13*a* and the projection 13*b* to be positioned. The extending direction of the optical fiber cable is defined by the projections 13*a* and 13*b* and the projections 12*a* and 12*b* described above.

The base portion 10 further includes projections 14*a* and 14*b*. The projections 14*a* and 14*b* are located closer to the lead-out tip of the optical fiber strand than the projections 13*a* and 13*b*, in other words, are located in the direction toward the fusion splicing unit 5 with respect to the projections 13*a* and 13*b*, and protrude from the placement surface 11. The projections 14*a* and 14*b* are third guide portions that position the optical fiber strand extending from the optical fiber cable in a direction intersecting the extending direction of the optical fiber strand. The projection 14*a* is disposed side by side the projection 14*b* in the direction intersecting the extending direction of the optical fiber strand. The optical fiber strand is sandwiched between the projection 14*a* and the projection 14*b* to be positioned.

The base portion 10 further includes a guide portion 15 (fourth guide portion). The guide portion 15 is located closer to the lead-out tip of the optical fiber strand than the projections 14*a* and 14*b*, in other words, are located in the direction toward the fusion splicing unit 5 with respect to the projections 14*a* and 14*b*. The guide portion 15 includes a slit 15*a* that position the optical fiber strand in the direction intersecting the extending direction of the optical fiber strand. An inner width of the slit 15*a* is slightly larger than an outer diameter of the optical fiber strand. The optical fiber strand is positioned by passing through the slit 15*a*.

The base portion 10 further includes a bearing portion 16 that rotatably supports a shaft 31 having a columnar shape. The bearing portion 16 is provided along the extending direction of the optical fiber cable at one end edge of the base portion 10 in the direction intersecting the extending direction of the optical fiber cable. The shaft 31 attaches the lid portion 20 to be described later to the base portion 10 so as to be openable and closable.

Figure 8:
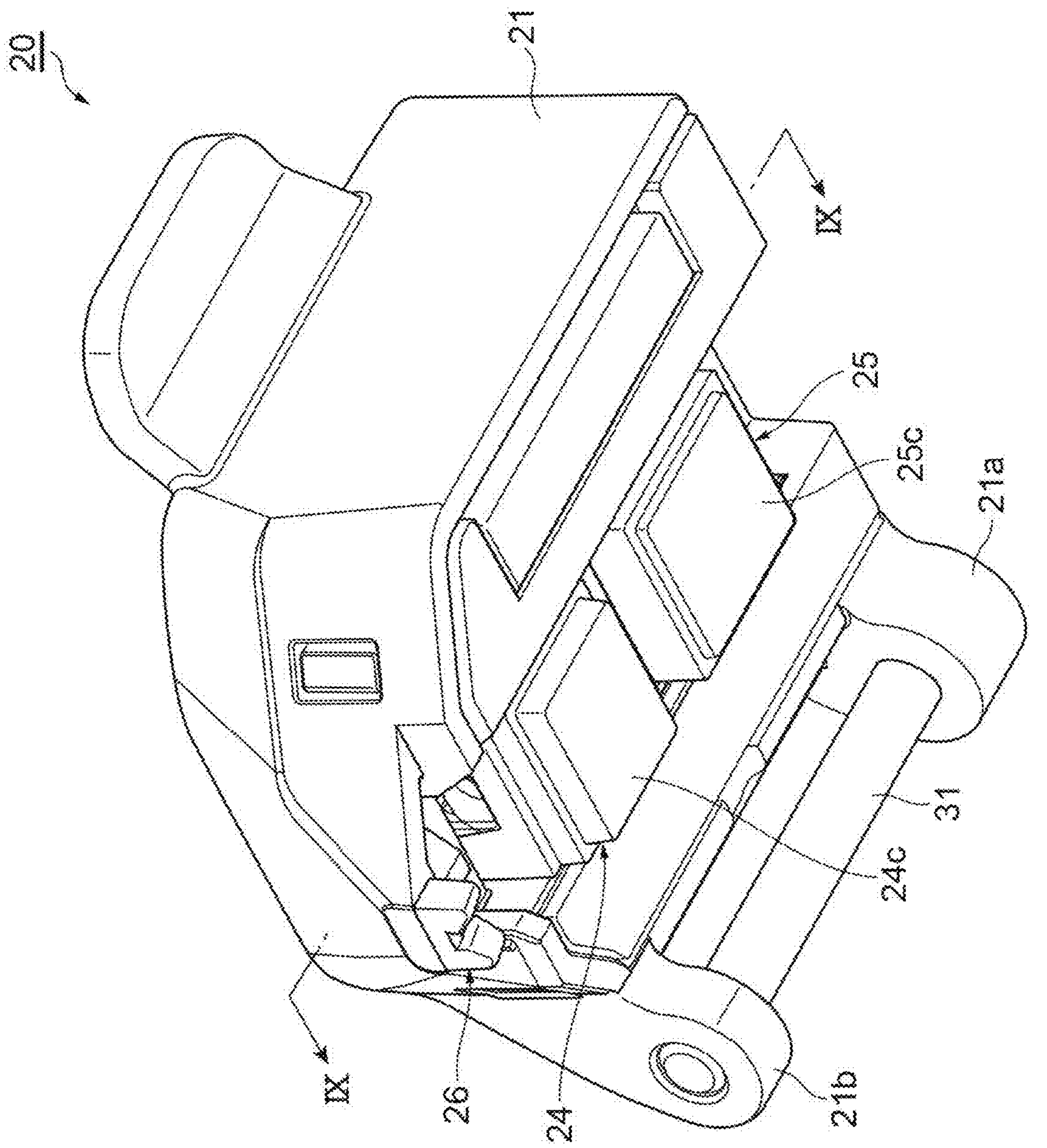
FIG. 8 is a perspective view illustrating the appearance of the lid portion, and illustrates the lid portion viewed obliquely from below.
Figure 9:
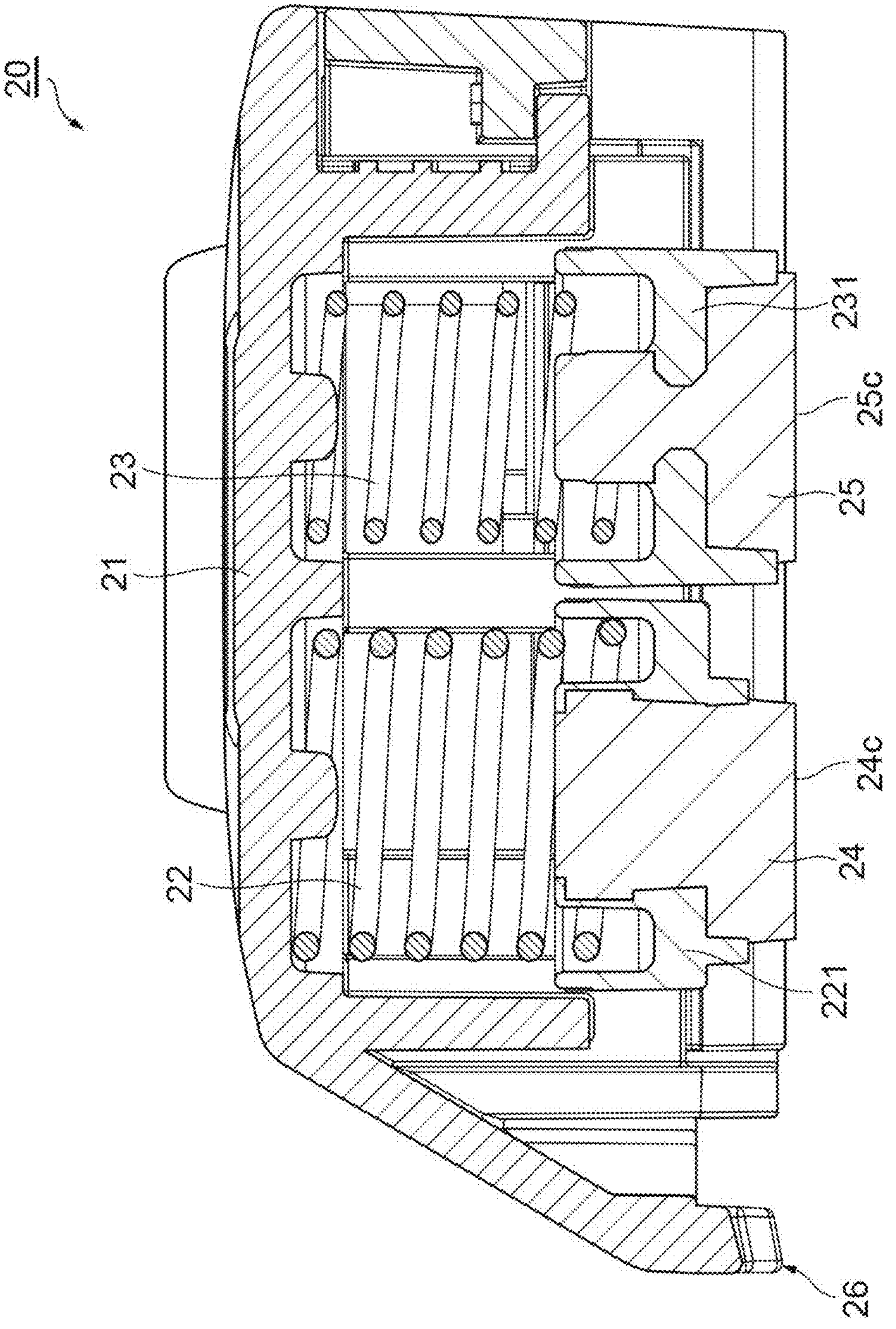
FIG. 9 is a cross-sectional view taken along line IX-IX illustrated in FIG. 8.

The lid portion 20 is openably and closably attached to the base portion 10 via the shaft 31 so as to cover at least a part of the placement surface 11. In the illustrated example, the lid portion 20 covers a region of the placement surface 11 between the projections 12*a* and 12*b* and the guide portion 15. FIG. 8 is a perspective view illustrating the appearance of the lid portion 20, and illustrates the lid portion 20 viewed obliquely from below. FIG. 9 is a cross-sectional view taken along line IX-IX illustrated in FIG. 8. As illustrated in these figures, the lid portion 20 includes a cover 21 that is open downward; two compression coil springs 22 and 23 accommodated in the cover 21; a first pad 24; a second pad 25; and an angle defining portion 26. As illustrated in FIG. 8, the cover 21 includes a pair of bearing portions 21*a* and 21*b* that are rotatably fitted to the shaft 31. The bearing portion 16 of the base portion 10 described above is disposed between the bearing portions 21*a* and 21*b*.

The compression coil spring 22 is disposed in front of the compression coil spring 23, namely, is disposed closer to the fusion splicing unit 5. The compression coil springs 22 and 23 are disposed with a direction intersecting the placement surface 11 of the base portion 10, for example, the normal direction of the placement surface 11 as a central axis direction in a state where the lid portion 20 is closed. Upper ends of the compression coil springs 22 and 23 are fitted to recessed portions formed on a lower surface of a top plate of the cover 21. Lower ends of the compression coil springs 22 and 23 are fitted to recessed portions formed on upper surfaces of spring receiving members 221 and 231, respectively. The spring receiving members 221 and 231 are disposed to be movable upward and downward inside the cover 21. The spring receiving members 221 and 231 hold the first pad 24 and the second pad 25, respectively. With this configuration, the first pad 24 and the second pad 25 are elastically supported and biased downward by the compression coil springs 22 and 23, respectively.

The first pad 24 and the second pad 25 are arranged along the extending direction of the optical fiber cable. The first pad 24 is located between the second pad 25 and a splice point between the bare fiber of the first optical fiber cable and the bare fiber of the second optical fiber cable that are to be fused. The first pad 24 and the second pad 25 mainly include, for example, an elastic material such as rubber. The first pad 24 and the second pad 25 have flat lower surfaces 24*c* and 25*c*, respectively. The lower surfaces 24*c* and 25*c* face the placement surface 11 in a state where the lid portion 20 is closed, and come into contact with the optical fiber cable to press the optical fiber cable against the placement surface 11. The shape of the lower surfaces 24*c* and 25*c* is, for example, a square shape or a rectangular shape. In the illustrated example, a width of the lower surface 24*c* in the extending direction of the optical fiber cable is smaller than a width of the lower surface 25*c* in the same direction.

Figure 10:
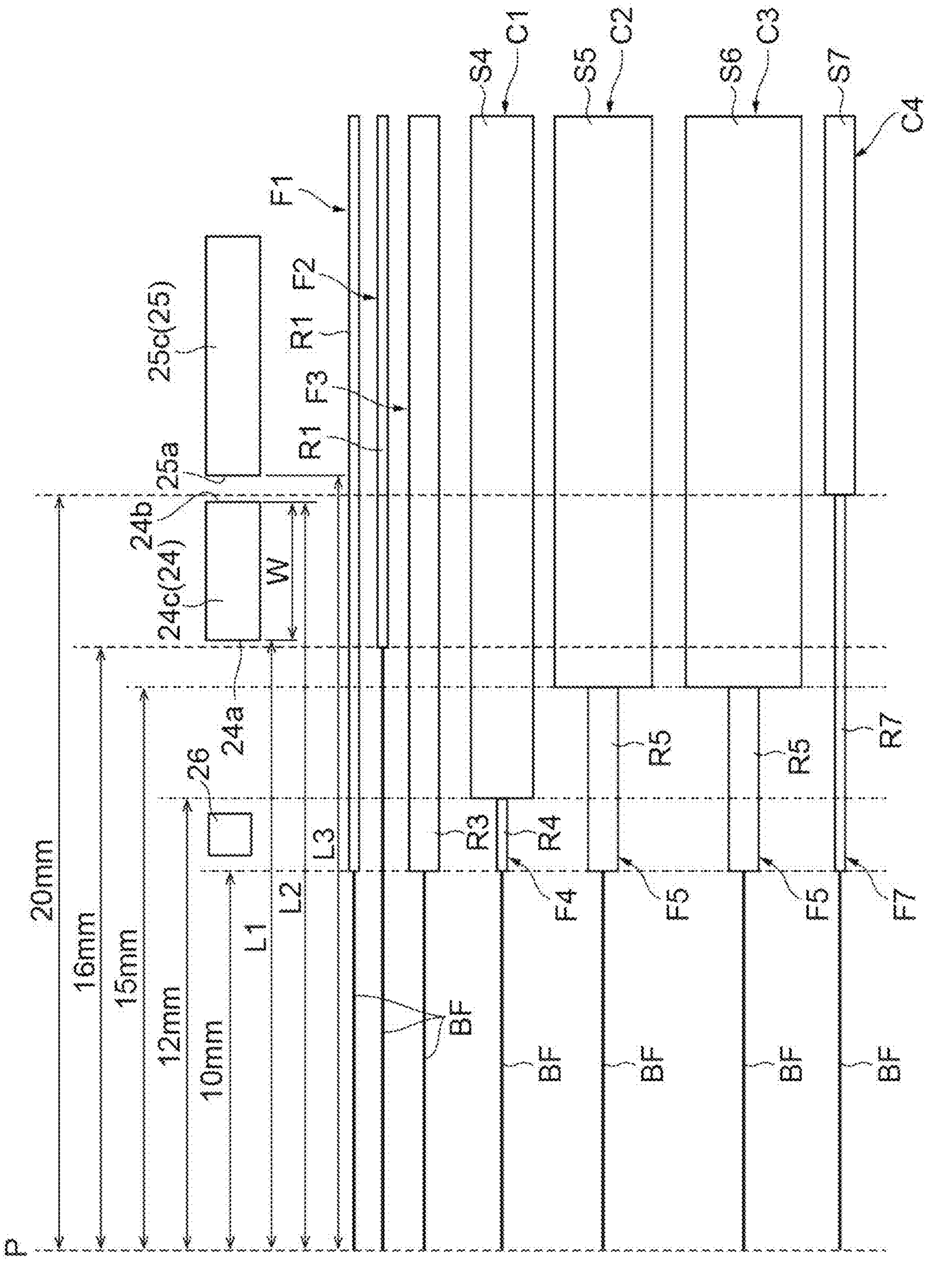
FIG. 10 is a view for describing the positions and sizes of a first pad and a second pad.

FIG. 10 is a view for describing the positions and sizes of the first pad 24 and the second pad 25. FIG. 10 illustrates optical fiber strands F1, F2, and F3, a drop cable C1, optical fiber cables C2 and C3, and a loose tube cable C4 in order to compare the positions and widths of the first pad 24 and the second pad 25.

The optical fiber strands F1 and F2 are optical fiber strands without a sheath, and include a glass fiber and a coating resin R1 covering the glass fiber. The glass fiber is exposed from a tip of the coating resin R1 to become a bare fiber BF. In the optical fiber strand F1, an exposed length of the bare fiber BF from the tip of the coating resin R1 is, for example, 10 mm. In the optical fiber strand F2, an exposed length of the bare fiber BF from the tip of the coating resin R1 is, for example, 16 mm. An outer diameter of the optical fiber strands F1 and F2, namely, an outer diameter of the coating resin R1 is 0.25 mm.

The optical fiber strand F3 is an optical fiber strand without a sheath, and includes a glass fiber and a coating resin R3 covering the glass fiber. The glass fiber is exposed from a tip of the coating resin R3 to become the bare fiber BF. An exposed length of the bare fiber BF from the tip of the coating resin R3 is, for example, 10 mm. An outer diameter of the optical fiber strand F3, namely, an outer diameter of the coating resin R3 is 0.9 mm.

The drop cable C1 includes an optical fiber strand F4 and a sheath S4 of which the cross section perpendicular to an extending direction has a rectangular shape and which covers the optical fiber strand F4. The optical fiber strand F4 includes a glass fiber and a coating resin R4 covering the glass fiber. The glass fiber is exposed from a tip of the coating resin R4 to become the bare fiber BF. An exposed length of the optical fiber strand F4 from a tip of the sheath S4 is, for example, 2 mm. An exposed length of the bare fiber BF from the tip of the coating resin R4 is, for example, 10 mm. An outer diameter of the optical fiber strand F4, namely, an outer diameter of the coating resin R4 is 0.25 mm.

The optical fiber cable C2 includes an optical fiber strand F5 and a sheath S5 of which the cross section perpendicular to an extending direction has a circular shape and which covers the optical fiber strand F5. The optical fiber cable C3 includes the optical fiber strand F5 and a sheath S6 of which the cross section perpendicular to an extending direction has a circular shape and which covers the optical fiber strand F5. The optical fiber strand F5 includes a glass fiber and a coating resin R5 covering the glass fiber. The glass fiber is exposed from a tip of the coating resin R5 to become the bare fiber BF. An exposed length of the optical fiber strands F5 from tips of the sheaths S5 and S6 is, for example, 5 mm. An exposed length of the bare fiber BF from the tip of the coating resin R5 is, for example, 10 mm. An outer diameter of the optical fiber strand F5, namely, an outer diameter of the coating resin R5 is 0.9 mm. A diameter of the optical fiber cable C2, namely, an outer diameter of the sheath S5 is 3.0 mm. A diameter of the optical fiber cable C3, namely, an outer diameter of the sheath S6 is 3.5 mm.

The loose tube cable C4 includes an optical fiber strand F7 and a loose tube S7 of which the cross section perpendicular to an extending direction has a circular shape and which covers the optical fiber strand F7. The optical fiber strand F7 includes a glass fiber and a coating resin R7 covering the glass fiber. The glass fiber is exposed from a tip of the coating resin R7 to become the bare fiber BF. An exposed length of the optical fiber strands F7 from a tip of the loose tube S7 is, for example, 10 mm. An exposed length of the bare fiber BF from the tip of the coating resin R7 is, for example, 10 mm. An outer diameter of the optical fiber strand F7, namely, an outer diameter of the coating resin R7 is 0.25 mm.

In such a manner, when the optical fiber strand F7 of the loose tube cable C4 is fusion-spliced, the optical fiber strand F7 is set to be exposed from the loose tube S7 by approximately 10 mm, and the bare fiber BF is set to be exposed from a tip portion of the optical fiber strand F7 by approximately 10 mm. On the other hand, when the optical fiber strand F2 is fusion-spliced, the bare fiber BF is set to be exposed from a tip portion of the optical fiber strand F2 by approximately 16 mm. For example, in the optical fiber holder described in Patent Literature 2, in order to hold an optical fiber strand without damaging a bare fiber, the pressing portion that presses the optical fiber strand is movable along an extending direction of the optical fiber strand. However, such a method has a problem that it takes time and effort to move the pressing portion.

In response to this problem, in the fusion splicer 1 of the present embodiment, a distance L1 between a splice point P of two bare fibers BF to be fused and a first end edge 24*a* of the first pad 24 close to the splice point is set to be larger than 16 mm. The splice point P is typically a midpoint between tips of the discharge electrodes 53 and 54. A distance L2 between the splice point P and a second end edge 24*b* on an opposite side of the first pad 24 from the first end edge 24*a* is set to be smaller than 20 mm. A distance L3 between the splice point P and an end edge 25*a* of the second pad 25 close to the splice point P is set to be larger than 20 mm. A width W of the first pad 24 in the extending direction of the optical fiber strands F1, F2, and F3, the drop cable C1, the optical fiber cables C2 and C3, and the loose tube cable C4 is less than 4 mm, for example, 3.5 mm.

By disposing the first pad 24 and the second pad 25 in such a manner, both the optical fiber strand F7 of the loose tube cable C4 and the optical fiber strand F2 can be pressed without moving the first pad 24 and the second pad 25 along the extending direction of the optical fiber strands. Namely, when the optical fiber strand F7 of the loose tube cable C4 is pressed, the first pad 24 can directly press the optical fiber strand F7 without coming into contact with the bare fiber BF, and the second pad 25 can press the loose tube S7. When the optical fiber strand F2 is pressed, the first pad 24 and the second pad 25 can press the optical fiber strand F2 without coming into contact with the bare fiber BF. Therefore, the time and effort required to move the first pad 24 and the second pad 25 can be saved.

In the optical fiber strand F1, the coating resin R1 is pressed by the first pad 24 and the second pad 25. In the optical fiber strand F3, the coating resin R3 is pressed by the first pad 24 and the second pad 25. In the drop cable C1, the sheath S4 is pressed by the first pad 24 and the second pad 25. In the optical fiber cable C2, the sheath S5 is pressed by the first pad 24 and the second pad 25. In the optical fiber cable C3, the sheath S6 is pressed by the first pad 24 and the second pad 25. The angle defining portion 26 to be described later is disposed within a range of 10 mm or more and 12 mm or less from the splice point P.

Referring again to FIGS. 8 and 9, the angle defining portion 26 is fixed to an end portion of two end portions of the lid portion 20 in an extending direction of an optical fiber cable. The end portion is located closer to a lead-out tip of an optical fiber strand. The angle defining portion 26 is located closer to the lead-out tip of the optical fiber strand than the first pad 24 and the second pad 25. The angle defining portion 26 covers the optical fiber strand (in other words, comes into contact therewith from above) to define a lead-out angle of the optical fiber strand. The fusion splicer 1 can fusion-splice optical fiber cables with sheaths (for example, the drop cables C1 or the optical fiber cable C2 or C3 illustrated in FIG. 10). In addition, the fusion splicer 1 can fusion-splice optical fiber strands without sheaths (for example, the optical fiber strands F1, F2, or F3 illustrated in FIG. 10). The optical fiber strand exposed from the optical fiber cable with a sheath and the optical fiber strand without a sheath have different center heights when placed on the placement surface 11. On the other hand, the heights of the discharge electrodes 53 and 54 in the fusion splicing unit 5 remain unchanged. Therefore, when the height of the discharge electrodes 53 and 54 corresponds to the center height of the optical fiber strand without a sheath, it is necessary to adjust the lead-out angle of the optical fiber strand exposed from the optical fiber cable with a sheath according to the height of the discharge electrodes 53 and 54. The angle defining portion 26 is provided for such angle adjustment. The optical fiber strand without a sheath does not come into contact with the angle defining portion 26.

Figure 11:
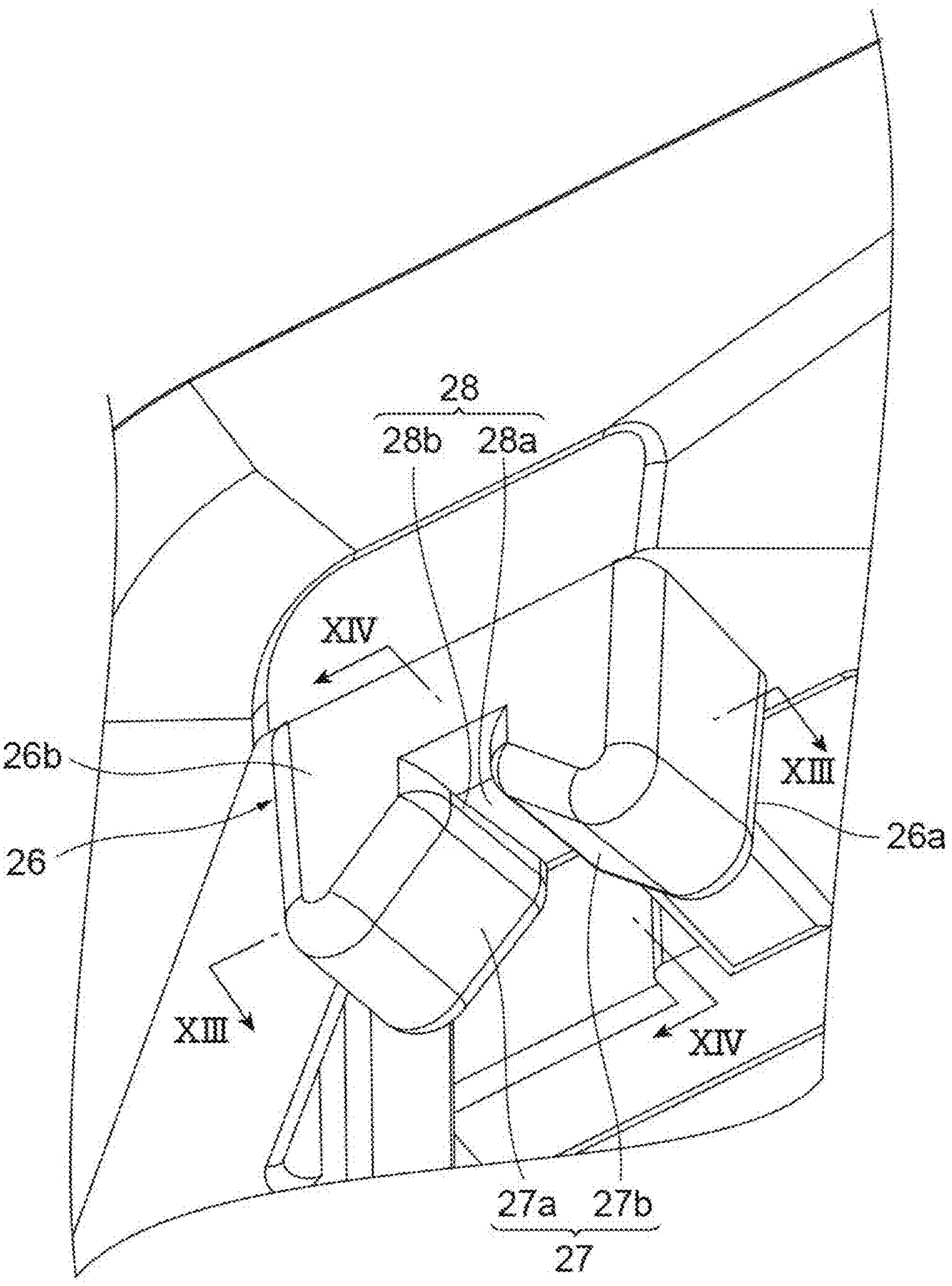
FIG. 11 is an enlarged perspective view illustrating an angle defining portion.
Figure 12:
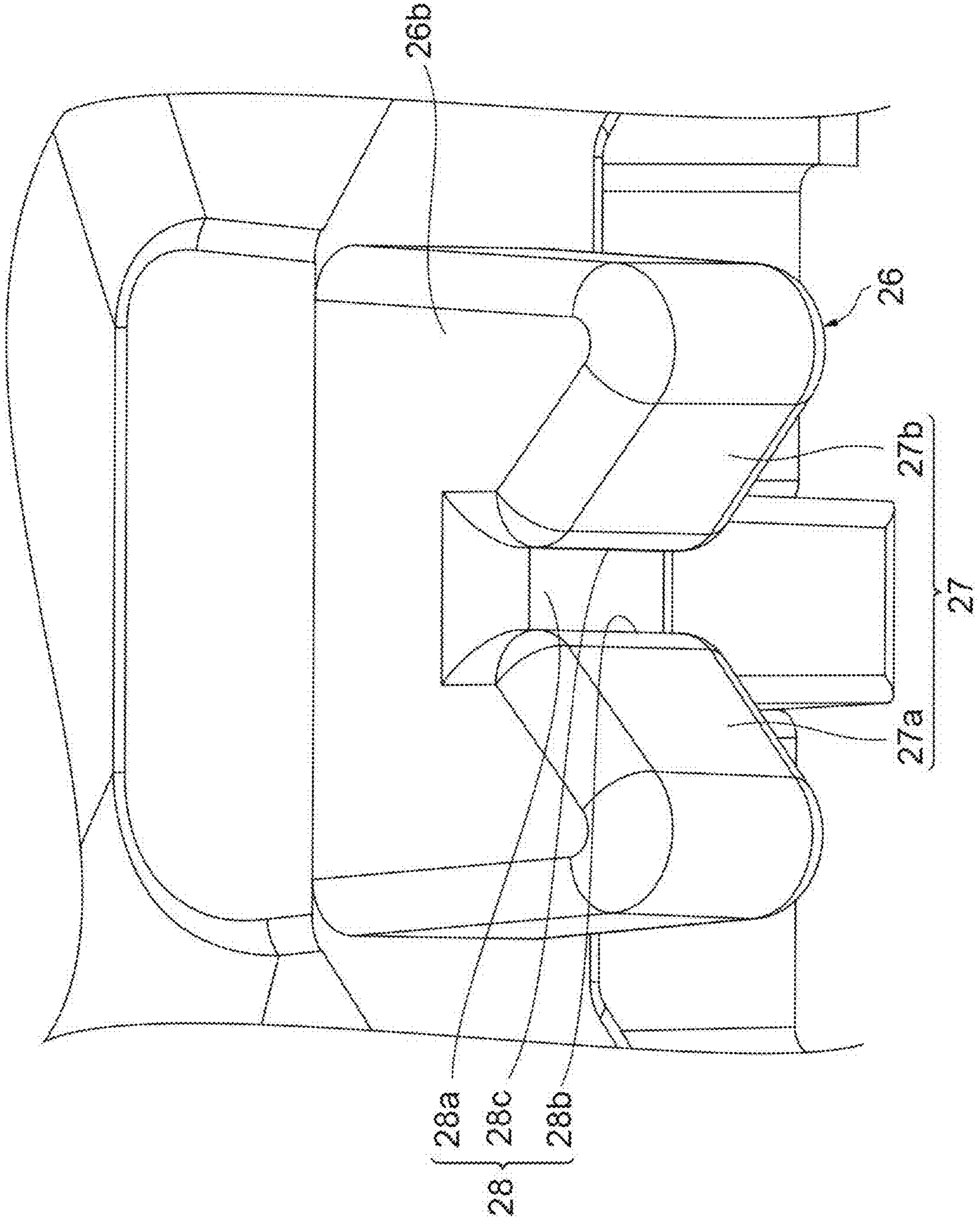
FIG. 12 is an enlarged perspective view illustrating the angle defining portion.
Figure 13:
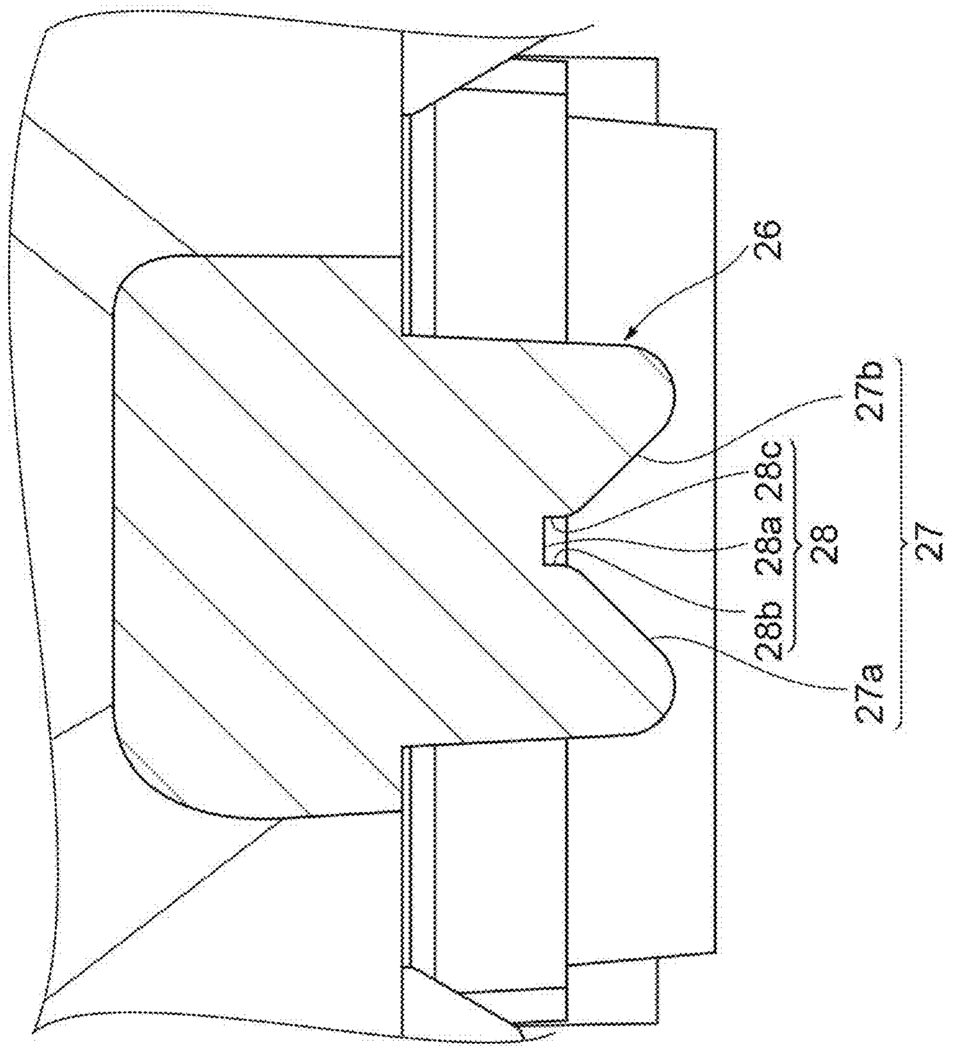
FIG. 13 is a cross-sectional view taken along line XIII-XIII illustrated in FIG. 11.
Figure 14:
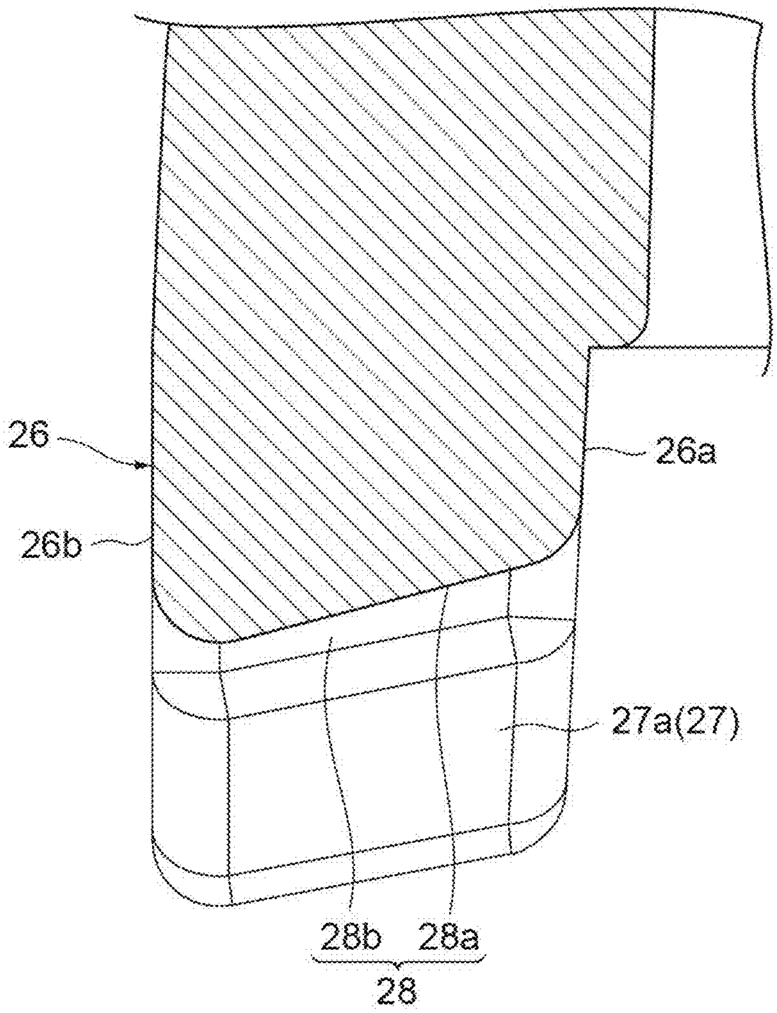
FIG. 14 is a cross-sectional view taken along line XIV-XIV illustrated in FIG. 11.

FIGS. 11 and 12 are enlarged perspective views illustrating the angle defining portion 26. FIG. 13 is a cross-sectional view taken along line XIII-XIII illustrated in FIG. 11. FIG. 14 is a cross-sectional view taken along line XIV-XIV illustrated in FIG. 11. As illustrated in these figures, the angle defining portion 26 of the present embodiment includes a first groove 27 and a second groove 28 provided at a central bottom portion of the first groove 27.

The first groove 27 is provided to accommodate an optical fiber strand having a first outer diameter, and defines a lead-out angle of the optical fiber strand. The first outer diameter is larger than 0.25 mm, for example, 0.9 mm. The first groove 27 extends, in the extending direction of the optical fiber strand, from a first end surface 26*a* of the angle defining portion 26, which is closer to the first pad 24, to a second end surface 26*b* on an opposite side of the angle defining portion 26 from the first end surface 26*a*. In other words, the first groove 27 penetrates between the first end surface 26*a* and the second end surface 26*b* of the angle defining portion 26 in the extending direction of the optical fiber strand. The first groove 27 has two flat inclined surfaces 27*a* and 27*b*. The normal lines of the inclined surfaces 27*a* and 27*b* intersect each other, and the inclined surfaces 27*a* and 27*b* form a V-groove. When the first groove 27 accommodates the optical fiber strand, the optical fiber strand comes into contact with the inclined surfaces 27*a* and 27*b*. At this time, the directions of the inclined surfaces 27*a* and 27*b* are set such that a central axis direction of the optical fiber strand is inclined downward, namely, in a direction toward the placement surface 11. In other words, the normal vectors of the inclined surfaces 27*a* and 27*b* slightly include a component in a rearward direction, namely, in a direction opposite to a lead-out direction of the optical fiber strand. A boundary between the first end surface 26*a* and the inclined surface 27*a* and a boundary between the first end surface 26*a* and the inclined surface 27*b* in the extending direction of the optical fiber strand are rounded (R-chamfered). A boundary between the second end surface 26*b* and the inclined surface 27*a* and a boundary between the second end surface 26*b* and the inclined surface 27*b* in the same direction are also rounded (R-chamfered).

The second groove 28 is provided to accommodate an optical fiber strand having a second outer diameter smaller than the first outer diameter, and defines a lead-out angle of an optical fiber strand. The second outer diameter is 0.25 mm or less, for example, 0.25 mm. The second groove 28 extends from the first end surface 26*a* of the angle defining portion 26 to the second end surface 26*b* in the extending direction of the optical fiber strand. In other words, the second groove 28 penetrates between the first end surface 26*a* and the second end surface 26*b* of the angle defining portion 26 in the extending direction of the optical fiber strand. The shape of a cross section of the second groove 28 perpendicular to an extending direction of an optical fiber is a square shape or a rectangular shape from the first end surface 26*a* to the second end surface 26*b*. Namely, the second groove 28 is formed by a bottom surface 28*a* and inner side surfaces 28*b* and 28*c*. When the second groove 28 accommodates the optical fiber strand, the optical fiber strand comes into contact with at least the bottom surface 28*a*. In a state where the lid portion 20 is closed, the bottom surface 28*a* is slightly inclined in a downward direction, namely, in a direction toward the placement surface 11 such that the farther the bottom surface 28*a* is from the first pad 24, the closer the bottom surface 28*a* is to the placement surface 11. In other words, the normal vector of the bottom surface 28*a* slightly includes a component in the rearward direction, namely, in a direction opposite to a lead-out direction of the optical fiber strand. Accordingly, a central axis direction of the optical fiber strand that is in contact with the bottom surface 28*a* is inclined in the downward direction. The bottom surface 28*a* may be flat or may be curved in a recessed shape. The inner side surfaces 28*b* and 28*c* extend along the extending direction of the optical fiber strand, and are parallel to each other. A boundary between the first end surface 26*a* and the bottom surface 28*a*, a boundary between the first end surface 26*a* and the inner side surface 28*b*, and a boundary between the first end surface 26*a* and the inner side surface 28*c* in the extending direction of the optical fiber strand are rounded (R-chamfered). A boundary between the second end surface 26*b* and the bottom surface 28*a*, a boundary between the second end surface 26*b* and the inner side surface 28*b*, and a boundary between the second end surface 26*b* and the inner side surface 28*c* in the same direction are also rounded (R-chamfered).

Effects obtained by the first optical fiber holder 3, the second optical fiber holder 4, and the fusion splicer 1 of the present embodiment having the above-described configurations will be described. As described above, in the first optical fiber holder 3 and the second optical fiber holder 4, the angle defining portion 26 includes the first groove 27 and the second groove 28. The first groove 27 is provided to accommodate an optical fiber strand having the first outer diameter, and defines a lead-out angle of the optical fiber strand. The second groove 28 is provided to accommodate an optical fiber strand having the second outer diameter, and defines a lead-out angle of the optical fiber strand. The second outer diameter is smaller than the first outer diameter, and the second groove 28 is provided at the central bottom portion of the first groove 27. According to such a configuration, when a center height of an optical fiber cable including the optical fiber strand having the second outer diameter is higher than a center height of an optical fiber cable including the optical fiber strand having the first outer diameter, fusion splicing can be performed without replacing the angle defining portion according to these optical fiber cables. Therefore, according to the first optical fiber holder 3 and the second optical fiber holder 4 of the present embodiment, it is possible to reduce the time and effort required to replace the member that defines the lead-out direction (lead-out angle) of the optical fiber strand.

As in the present embodiment, the second groove 28 may accommodate an optical fiber strand having an outer diameter of 0.25 mm or less, and the first groove 27 may accommodate an optical fiber strand having an outer diameter larger than 0.25 mm. In this case, the fusion splicing of optical fiber cables (for example, the drop cables C1), each including the optical fiber strand having an outer diameter of 0.25 mm or less, and the fusion splicing of optical fiber cables (for example, the optical fiber cables C2 or C3), each including the optical fiber strand having an outer diameter larger than 0.25 mm, can be performed without replacing the angle defining portion.

As in the present embodiment, the angle defining portion 26 may be fixed to an end portion of the two end portions of the lid portion 20, and the end portion is located closer to a lead-out tip of the optical fiber strand in an extending direction of the optical fiber cable. In this case, it is possible to easily install the angle defining portion 26 that is located closer to the lead-out tip of the optical fiber strand than the first pad 24 and the second pad 25, and that covers the optical fiber strand exposed from the sheath.

As in the present embodiment, the first groove 27 may have the two flat inclined surfaces 27*a* and 27*b*, the normal lines of the inclined surfaces 27*a* and 27*b* may intersect with each other, and the inclined surfaces 27*a* and 27*b* may form a V-groove. In this case, the optical fiber strand can be stably accommodated by bringing the optical fiber strand into contact with the inclined surfaces 27*a* and 27*b*.

As in the present embodiment, the directions of the inclined surfaces 27*a* and 27*b* may be set such that a central axis direction of the optical fiber strand is inclined in the direction toward the placement surface 11. For example, with such a configuration, it is possible to define the lead-out angle of the optical fiber strand.

As in the present embodiment, the boundary between the first end surface 26*a* and the first groove 27 and the boundary between the second end surface 26*b* and the first groove 27 may be rounded. In this case, it is possible to reduce damage to the optical fiber strand when the optical fiber strand is accommodated in the first groove 27.

As in the present embodiment, the boundary between the first end surface 26*a* and the second groove 28 and the boundary between the second end surface 26*b* and the second groove 28 may be rounded. In this case, it is possible to reduce damage to the optical fiber strand when the optical fiber strand is accommodated in the second groove 28.

The optical fiber holder and the fusion splicer according to the present disclosure are not limited to the above-described embodiment, and can be modified in various other forms. For example, in the above-described embodiment, each of the first optical fiber holder 3 and the second optical fiber holder 4 includes two pads such as the first pad 24 and the second pad 25. Each of the first optical fiber holder 3 and the second optical fiber holder 4 may include only one pad or may include three or more pads. In the above-described embodiment, the case where the shape of the cross section of the second groove 28 is a square shape or a rectangular shape has been provided as an example. The shape of the cross section of the second groove 28 is not limited thereto, and may be various shapes, for example, a semicircular shape. In the above-described embodiment, the case where the first groove 27 accommodates an optical fiber strand with a diameter of 0.9 mm and the second groove 28 accommodates an optical fiber strand with a diameter of 0.25 mm has been provided as an example. The diameters of the optical fiber strands accommodated in the first groove 27 and the second groove 28 are not limited thereto.

REFERENCE SIGNS LIST

1: fusion splicer, 2: housing, 3: first optical fiber holder, 4: second optical fiber holder, 5: fusion splicing unit, 6: heater, 7: monitor, 8: windshield cover, 10: base portion, 11: placement surface, 12*a*, 12*b*, 13*a*, 13*b*, 14*a*, 14*b*: projection, 15: guide portion, 15*a*: slit, 16: bearing portion, 20: lid portion, 21: cover, 21*a*, 21*b*: bearing portion, 22, 23: compression coil spring, 24: first pad, 25: second pad, 24*a*: first end edge, 24*b*: second end edge, 25*a*: end edge, 24*c*, 25*c*: lower surface, 26: angle defining portion, 26*a*: first end surface,

26*b*: second end surface, 27: first groove, 27*a*, 27*b*: inclined surface, 28: second groove, 28*a*: bottom surface, 28*b*, 28*c*: inner side surface, 31: shaft, 51, 52: positioning member, 53, 54: discharge electrode, 121*a*, 121*b*: side surface, 122*a*, 122*b*: region, 123*a*, 123*b*: region, 221, 231: spring receiving member, BF: bare fiber, C1: drop cable, C2, C3: optical fiber cable, C4: loose tube cable, F1, F2, F3, F4, F5, F7: optical fiber strand, P: splice point, R1, R3, R4, R5, R7: coating resin, S4, S5, S6: sheath, S7: loose tube.

The invention claimed is:

1. An optical fiber holder configured to hold an optical fiber cable including an optical fiber strand and a sheath covering the optical fiber strand, and to expose the optical fiber strand to an outside, the optical fiber holder comprising:

a base portion having a placement surface on which the optical fiber cable is placed; and a lid portion configured to be openably and closably attached to the base portion to cover at least a part of the placement surface, wherein the lid portion includes one or a plurality of pads facing the placement surface and pressing the optical fiber cable against the placement surface in a state where the lid portion is closed, and an angle defining portion that is located closer to a lead-out tip of the optical fiber strand than all the pads in an extending direction of the optical fiber strand, and that covers the optical fiber strand exposed from the sheath to define a lead-out angle of the optical fiber strand, the angle defining portion includes a first groove and a second groove, the first groove is provided to accommodate a first optical fiber strand having a first outer diameter, which is the optical fiber strand, and defines a lead-out angle of the first optical fiber strand, the second groove is provided at a central bottom portion of the first groove, is provided to accommodate a second optical fiber strand having a second outer diameter smaller than the first outer diameter, which is the optical fiber strand, and defines a lead-out angle of the second optical fiber strand, and the first groove and the second groove extend, in the extending direction of the optical fiber strand, from a first end surface of the angle defining portion close to the one or plurality of pads to a second end surface on an opposite side of the angle defining portion from the first end surface.

2. The optical fiber holder according to claim 1, wherein the second outer diameter is 0.25 mm or less, and the first outer diameter is larger than 0.25 mm.

3. The optical fiber holder according to claim 1, wherein a shape of a cross section of the second groove perpendicular to the extending direction of the optical fiber strand is a square shape or a rectangular shape from the first end surface to the second end surface.

4. The optical fiber holder according to claim 1, wherein the base portion includes a first projection and a second projection arranged in a direction intersecting the extending direction of the optical fiber cable, and protruding from the placement surface, the optical fiber cable is sandwiched between the first projection and the second projection to be positioned, the first projection has a first side surface, the second projection has a second side surface, the first side surface and the second side surface face each other, a distance between the first side surface and the second side surface increases as the first side surface and the second side surface extend away from the placement surface, each of the first side surface and the second side surface includes a first region, the first region of each of the first side surface and the second side surface reaches both ends of each of the first projection and the second projection respectively in the extending direction of the optical fiber cable, each of the first side surface and the second side surface further includes a second region located between the first region and the placement surface, and an inclination angle of each first region with respect to the placement surface is smaller than an inclination angle of each respective second region with respect to the placement surface.

5. The optical fiber holder according to claim 1, wherein the angle defining portion is fixed to an end portion of two end portions of the lid portion in the extending direction of the optical fiber cable, the end portion being located closer to the lead-out tip of the optical fiber strand.

6. The optical fiber holder according to claim 1, wherein the first groove has two flat inclined surfaces, normal lines of the two inclined surfaces intersect each other, and the two flat inclined surfaces form a V-groove.

7. The optical fiber holder according to claim 6, wherein directions of the two inclined surfaces are set such that a central axis direction of the first optical fiber strand is inclined in a direction toward the placement surface.

8. The optical fiber holder according to claim 1, wherein a boundary between the first end surface and the first groove and a boundary between the second end surface and the first groove are rounded.

9. The optical fiber holder according to claim 1, wherein a boundary between the first end surface and the second groove and a boundary between the second end surface and the second groove are rounded.

10. A fusion splicer comprising:

a first optical fiber holder and a second optical fiber holder each of which is the optical fiber holder according to claim 1; and a fusion splicing unit configured to fusion-splice a bare fiber exposed from the optical fiber strand of a first optical fiber cable that is the optical fiber cable held by the first optical fiber holder and a bare fiber exposed from the optical fiber strand of a second optical fiber cable that is the optical fiber cable held by the second optical fiber holder, through a discharge.

11. The fusion splicer according to claim 10, wherein in each of the first optical fiber holder and the second optical fiber holder, the plurality of pads includes a first pad and a second pad arranged along the extending direction of the respective optical fiber cable, the first pad is located between the second pad and a splice point between the bare fiber of the first optical fiber cable and the bare fiber of the second optical fiber cable, a distance between the splice point and a first end edge of the first pad close to the splice point is larger than 16 mm, a distance between the splice point and a second end edge on an opposite side of the first pad from the first end edge is smaller than 20 mm, and a distance between the splice point and an end edge of the second pad close to the splice point is larger than 20 mm.

* * * * *